Figure 3:
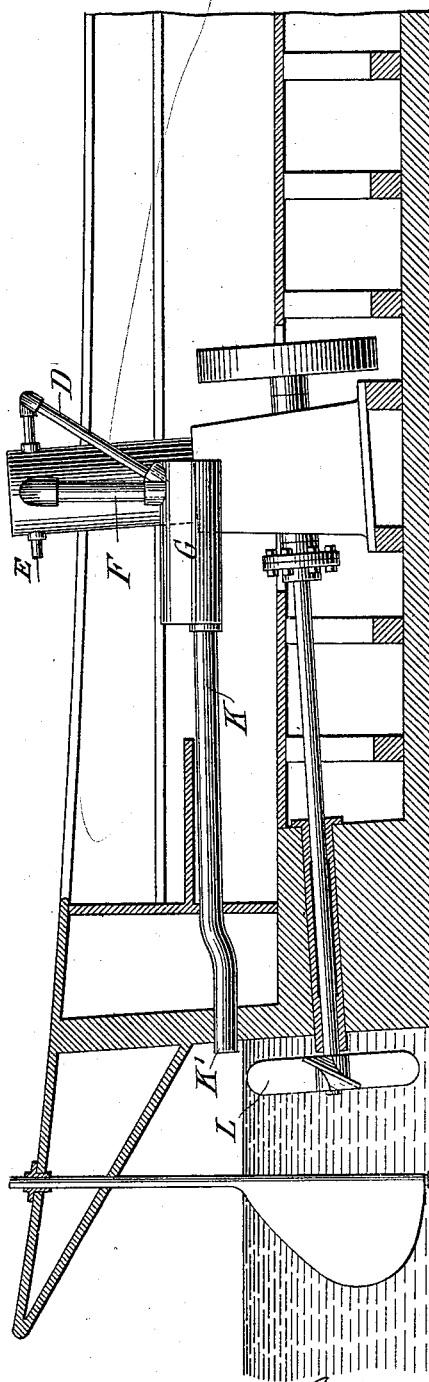

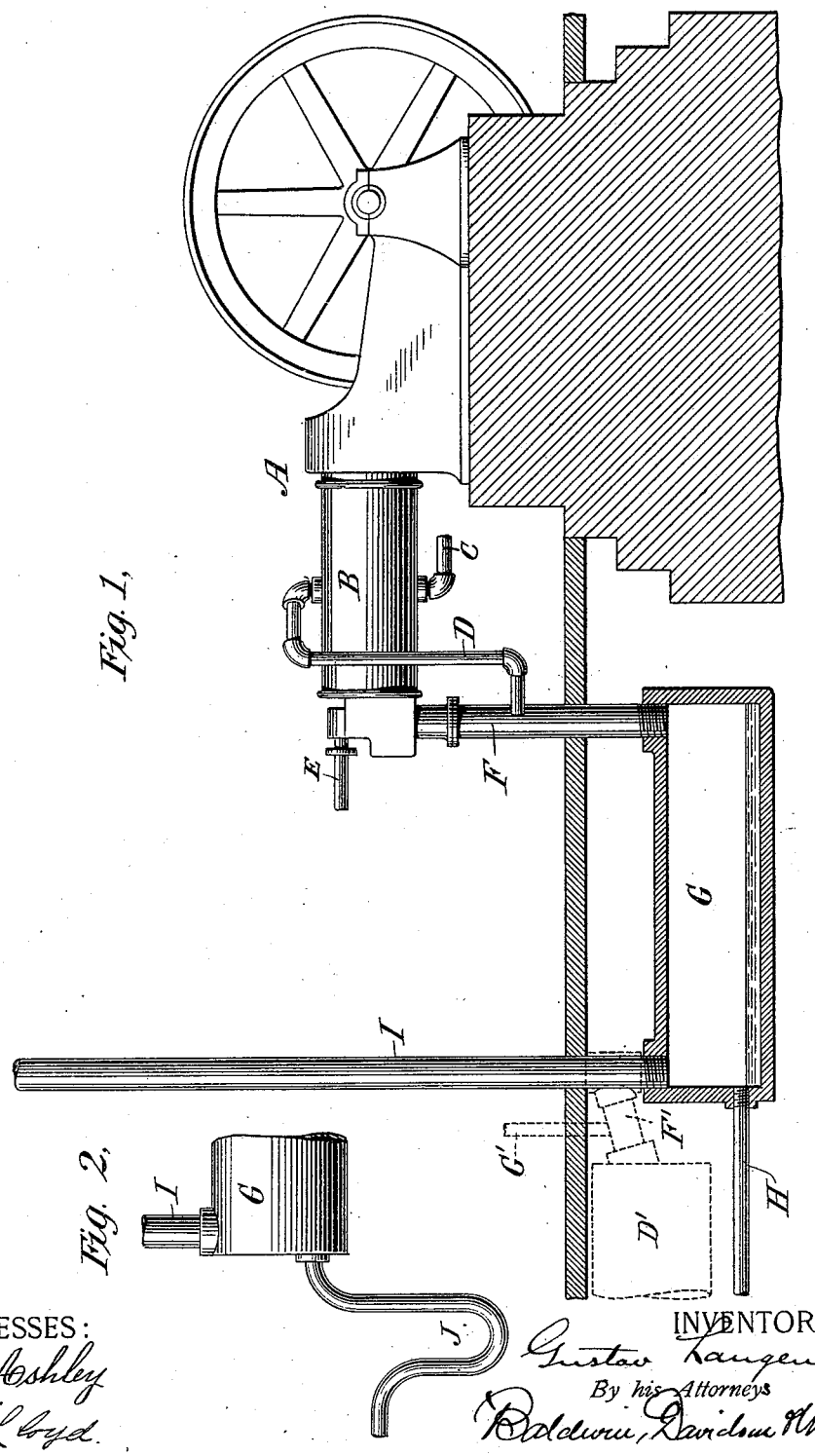

UNITED STATES PATENT OFFICE.

GUSTAV LANGEN, OF PHILADELPHIA, PENNSYLVANIA.

MEANS FOR OBVIATING SMELL OF INTERNAL-COMBUSTION ENGINES.

SPECIFICATION forming part of Letters Patent No. 583,600, dated June 1, 1897.

Application filed January 14, 1896. Serial No. 575,516. (No model.)

*To all whom it may concern:*

Be it known that I, GUSTAV LANGEN, a subject of the Emperor of Germany, residing at Philadelphia, in the county of Philadelphia and State of Pennsylvania, have invented certain new and useful Improvements in Means for Obviating the Smell of Internal-Combustion Engines, of which the following is a specification.

In the operation of internal-combustion engines using as fuel gas, gasolene, or oil the products of combustion within the cylinder or explosion-chamber contain noxious and unpleasant constituents in gaseous form, being the results of reactions developed by the explosion, or in some cases being due to the imperfect combustion of the fuel itself. Such unwholesome or disagreeable gases from the exhaust of the engine may be, I have found, entirely or to a great extent absorbed by water and be thus neutralized or eliminated from the exhaust.

My invention therefore contemplates certain improvements in the organization and operation of such engines to obviate the ill effects due to the noxious elements of the gases and the annoyance due to their discharge from the engine after expending the energy of their explosion therein. To this end a stream of water is caused to commingle with the exhaust-gases in the pipe through which they discharge from the engine, and the water for this purpose is preferably waste water taken from the water-jacket or cooling-chamber of the engine.

The receiving vessel, into which the exhaust-gases and waste water enter, is provided with a water-overflow and a gas-discharge pipe for the escape of the water and of the gases that are unaffected by the water. In some cases— as, for instance, where my invention is applied to marine purposes—the pipe from the overflow of the receiving-tank acts as a conduit for the water and the gases, and its discharge end will extend outside the boat and be preferably arranged to discharge beneath the water when the boat is in motion, and thus also prevent the noise of the exhaust to a considerable extent.

When my invention is applied to a land or stationary internal-combustion engine, a pipe extending upwardly from the receiving vessel is provided to discharge the exhaust-gases above the building in which the engine is placed, and the water-discharge pipe is preferably provided with or formed into a water-trap to prevent the gases flowing out of this pipe; but to describe my invention more particularly I will refer to the accompanying drawings, in which—

Figure 1 illustrates the application of my invention to a stationary internal-combustion engine. Fig. 2 is a modification showing a water-trap in the water-overflow pipe of the receiving vessel, and Fig. 3 shows my invention applied to a boat-propelling internal-combustion engine.

In the views of the drawings, A represents an internal-combustion engine, B the water-jacket or cooling-chamber, C the water-supply pipe to said water-jacket, D the water-discharge pipe therefrom, E the gas or oil supply pipe, and F the exhaust-pipe, all of the ordinary construction.

As shown at Fig. 1, the exhaust-pipe F is joined to the top of the receiving vessel or exhaust-box G and the discharge-pipe D from the water-jacket enters the side of the pipe F, thus causing a commingling of the exhaust-gases and the water-discharge from the water-jacket as they enter the vessel G. By this commingling of the gases and the water the noxious elements or parts of the gases are absorbed or taken up by the water, the water in the condition in which it leaves the water-jacket being found well adapted to accomplish this object.

The water collects in the vessel G and is discharged through the overflow-pipe H, which may extend into a sewer or other waste-conduit. The gases escape from the vessel G through the vertically-arranged pipe I, located at the other end of the vessel G, to which the exhaust-pipe F is attached, thus causing the gases to pass over the water in the vessel to be further and fully acted upon by the water as the gases flow through the vessel. To prevent the gases from passing out of the water-discharge pipe H, I propose to provide said pipe with a trap J, which may be of the simple construction shown at Fig. 2.

Should it be desired or advantageous to submit the exhaust-gases to the further action of water than they receive in entering and in the vessel G, then the gas-outlet of said vessel may be formed, as at F', to enter the vessel D', (shown by dotted lines in Fig. 1,) a water-pipe G' being arranged to discharge a stream of water into the pipe F'. This duplication of the essential parts of my invention may be useful or advantageous where the supply of cleansing-water is limited.

In the application of my improved water treatment of the exhaust-gases of internal-combustion engines for marine purposes the overflow-pipe K of the vessel G acts as a conduit for the water and the gases and is extended through the side of the vessel with its mouth arranged beneath the surface of the water. In the drawing Fig. 3 the mouth K' of said pipe is located just above the screw-propeller L, and will be surrounded by water thrown up by the propeller when the engine is in operation and the boat moving.

I am aware that heretofore it has been proposed to discharge the exhaust of a gas-engine into a chamber containing water from the water-jacket of the engine. My organization is distinguished from such an arrangement in that I discharge the water into the exhaust-pipe, the effect being to break up or spray the water, and the water and exhaust products commingled pass together to the receiving-chamber. With such arrangement the gases are more completely and thoroughly acted upon in the manner described.

I claim as my invention—

In an internal-combustion engine, the combination of the exhaust-pipe, the water-jacket, the discharge-pipe from the water-jacket arranged to discharge the water into the exhaust-pipe at a point between its outlet and the engine, and beyond which point the exhaust-pipe is prolonged and through which prolonged portion of the exhaust-pipe the commingled exhaust products and water pass in the same direction together to the common discharge-opening of the pipe.

In testimony whereof I have hereunto subscribed my name.

GUSTAV LANGEN.

Witnesses:
R. S. REED,
ISAIAH MATLACK.